United States Patent
Duarte et al.

(10) Patent No.: US 7,808,477 B2
(45) Date of Patent: Oct. 5, 2010

(54) SCROLL DISC INPUT APPARATUS FOR A DATA PROCESSING DEVICE

(75) Inventors: Matias G. Duarte, Los Angeles, CA (US); Joseph Palmer, San Jose, CA (US)

(73) Assignee: Microsoft Corporation, Redmond, WA (US)

( * ) Notice: Subject to any disclaimer, the term of this patent is extended or adjusted under 35 U.S.C. 154(b) by 441 days.

(21) Appl. No.: 11/325,091

(22) Filed: Jan. 3, 2006

(65) Prior Publication Data

US 2006/0202951 A1      Sep. 14, 2006

Related U.S. Application Data

(60) Provisional application No. 60/641,631, filed on Jan. 4, 2005.

(51) Int. Cl.
*G09G 5/00* (2006.01)
(52) U.S. Cl. ...................................... 345/156
(58) Field of Classification Search ......... 345/156–167; 710/1–74; 715/856–862
See application file for complete search history.

(56) References Cited

U.S. PATENT DOCUMENTS

| | | | |
|---|---|---|---|
| 3,005,055 A * | 10/1961 | Mattke | 341/184 |
| 4,652,871 A * | 3/1987 | Tsukada et al. | 345/164 |
| 5,856,827 A * | 1/1999 | Sudo | 715/841 |
| 6,344,643 B1 * | 2/2002 | Chen | 250/221 |
| 6,546,231 B1 * | 4/2003 | Someya et al. | 455/550.1 |
| 6,570,583 B1 * | 5/2003 | Kung et al. | 345/661 |
| 2002/0030665 A1 * | 3/2002 | Ano | 345/168 |
| 2002/0149567 A1 * | 10/2002 | Griffin et al. | 345/169 |
| 2002/0171621 A1 * | 11/2002 | Johnson | 345/156 |
| 2003/0025673 A1 * | 2/2003 | Ledbetter et al. | 345/163 |
| 2003/0043121 A1 * | 3/2003 | Chen | 345/169 |
| 2003/0076303 A1 * | 4/2003 | Huppi | 345/163 |
| 2003/0107603 A1 * | 6/2003 | Clapper | 345/784 |
| 2003/0122779 A1 * | 7/2003 | Martin et al. | 345/156 |
| 2004/0056837 A1 * | 3/2004 | Koga et al. | 345/156 |
| 2004/0228639 A1 * | 11/2004 | Badovinac et al. | 399/8 |
| 2005/0052425 A1 * | 3/2005 | Zadesky et al. | 345/173 |
| 2005/0122806 A1 * | 6/2005 | Arakawa et al. | 365/202 |

FOREIGN PATENT DOCUMENTS

WO    WO 2004006549 A1 *   1/2004

* cited by examiner

*Primary Examiner*—Alexander Eisen
*Assistant Examiner*—Liliana Cerullo

(57) ABSTRACT

An apparatus is described comprising: a data processing device having a memory for storing program code and data and a processor for processing the program code and data, and a display for displaying graphical images and text; a control disc rotatably and communicatively engaged with the data processing device, the control disc rotating on an axis which is substantially perpendicular to a plane defined by the display, the control disc communicatively engaged with the data processing device to cause a graphic element on the display to move in a first direction by a first predefined amount when rotated in a first direction and causing the graphic element to move in a second direction by the first predefined amount when rotated in a second direction.

11 Claims, 7 Drawing Sheets

SCROLL DISC INPUT APPARATUS FOR A DATA PROCESSING DEVICE

RELATED APPLICATION

This application claims priority from the provisional application entitled SCROLL DISK INPUT APPARATUS FOR A DATA PROCESSING DEVICE, Ser. No. 60/641,631 filed Jan. 4, 2005.

TECHNICAL FIELD

This application relates generally to the field of data processing devices, and more particularly, to a scroll disc input apparatus for a data processing device.

BACKGROUND

Portable data processing devices such as Personal Digital Assistants ("PDAs") and programmable wireless telephones are becoming more powerful every day, providing users with a wide range of applications previously only available on personal computers. At the same time, due to advances in silicon processing technology and battery technology, these devices may be manufactured using smaller and smaller form factors. Accordingly, users no longer need to sacrifice processing power for portability when selecting a personal data processing device.

Although processing devices with small form factors tend to be more portable, users may find it increasingly difficult to interact with them. For example, entering data may be difficult due to the absence of a full-sized keyboard and reading information may be difficult due to a small, potentially dim Liquid Crystal Display ("LCD").

To deal with this problem, devices have been produced which physically adjust to an "active" position when in use and an "inactive" position when not in use. For example, the well-known Motorola® Star-TAC® wireless telephone flips open when in use, thereby exposing a telephone keypad, a display and an earpiece. However, when this device retracts to an "inactive" position, the keypad, display, and earpiece are all completely inaccessible.

To solve these problems, the assignee of the present application developed a data processing device 100 with an adjustable display 103 as illustrated in FIGS. 1a-c. The data processing device 100 includes a keyboard 101, a control knob/wheel 102 (e.g., for scrolling between menu items and/or data), and a set of control buttons 105 (e.g., for selecting menu items and/or data).

The display 103 is pivotally coupled to the data processing device 100 and pivots around a pivot point 109, located within a pivot area 104, from a first position illustrated in FIG. 1a to a second position illustrated in FIGS. 1b-c. When in the first position the display 103 covers the keyboard 101, thereby decreasing the size of the device 100 and protecting the keyboard 101. Even when the display is in the first position, however, the control knob 102 and control buttons 105 are exposed and therefore accessible by the user. The motion of the display 103 from the first position to a second position is indicated by motion arrow 106 illustrated in FIGS. 1a-b. As illustrated, when in the second position, the keyboard 101 is fully exposed. Accordingly, the display is viewable, and data is accessible by the user in both the first position and the second position (although access to the keyboard is only provided in the first position).

The data processing device 100 is also provided with audio telephony (e.g., cellular) capabilities. To support audio telephony functions, the embodiment illustrated in FIGS. 1a-c includes a speaker 120 for listening and a microphone 121 for speaking during a telephone conversation. Notably, the speaker 120 and microphone 121 are positioned at opposite ends of the data processing device 100 and are accessible when the screen 103 is in a closed position and an open position.

Another data processing device developed by the assignee of the present application is illustrated in FIG. 2. Like the data processing device illustrated in FIGS. 1a-c, the display of the device shown in FIG. 2 is configured to rotate around a pivot point to reveal a keyboard. The data processing device 200 also includes a first set of control elements 215 positioned to the right of the display 210 and a second set of control elements 220 positioned to the left of the display.

The first set of control elements 215 includes a control wheel 230 positioned between two control buttons 226, 235, as illustrated. The control wheel 230 may be used to move a cursor control device, highlight bar or other selection graphic on the display to select menu items, program icons and/or other graphical or textual display elements. In one embodiment, the control wheel 230 is made of clear plastic with an light emitting diode ("LED") or other light source embedded therein.

A series of additional control elements 250, 255, 260, and 270 are configured on the data processing device 200 to provide various additional preprogrammed and/or user-specified control functions. For example, a control element 250 may be a designated "home" key for jumping to the data processing device's main menu, or performing application-specific functions typically associated with a "home" key (e.g., moving a cursor to the beginning of a line in a word processing document). Control element 255 may be a dedicated a "menu" key which generates a context-specific menu when selected (e.g., a different menu may be generated based on which application is currently running). Control keys 260 and 265 may be designated "jump" keys, allowing the user to easily jump to (i.e., execute) a designated application program. The control elements 250, 255, 260 and 265 may be programmed for various alternate and/or additional functions.

The second set of control elements includes a directional pad 245 having an integrated speaker 246 and/or LED (not shown) (or other light source). The directional pad 245 may be used to move a cursor or other selection graphic in any direction on the display to enable selection of menu items, program icons and other graphical or textual display elements. The directional pad 245 may be made of frosted translucent plastic and may be white in color, although other materials and colors may be used. The LED contained in the directional pad may be a tri-color LED that generates a variety of colors to alert the user when an incoming message has been received. When used as a telephone, the speaker 246 contained in the directional pad 245 enables the user to hear the party on the other end of a call. In addition, a microphone 240 is configured at the end of the data processing device 200 opposite the speaker 246 so that the data processing device 200 may be held like a mobile phone while in telephony mode (i.e., when the speaker placed next to the user's ear, the microphone is located in the proximity of the user's mouth).

SUMMARY

An apparatus is described comprising: a data processing device having a memory for storing program code and data and a processor for processing the program code and data, and a display for displaying graphical images and text; a control disc rotatably and communicatively engaged with the data processing device, the control disc rotating on an axis which is substantially perpendicular to a plane defined by the display, the control disc communicatively engaged with the data processing device to cause a graphic element on the display to move in a first direction by a first predefined amount when rotated in a first direction and causing the graphic element to move in a second direction by the first predefined amount when rotated in a second direction.

BRIEF DESCRIPTION OF THE DRAWINGS

A better understanding of a scroll disc input apparatus for a data processing device can be obtained from the following detailed description in conjunction with the following drawings, in which.

DETAILED DESCRIPTION

In the following description, for the purposes of explanation, numerous specific details are set forth in order to provide a thorough understanding of the scroll disc input apparatus for a data processing device. It will be apparent, however, to one skilled in the art that the techniques may be practiced without some of these specific details. In other instances, well-known structures and devices are shown in block diagram form to avoid obscuring the underlying principles of the scroll disc input apparatus for a data processing device.

Several different multi-purpose input/output and display configurations for a data processing device are described below. As will be apparent from the following description, many of these configurations are particularly beneficial when employed on a dual-purpose data processing device such as a personal digital assistant ("PDA") or other mobile computing device having integrated wireless telephony capabilities (e.g., a combination PDA and cell phone). However, it should be noted that the underlying principles of the scroll disc input apparatus for a data processing device are not limited to wireless telephony configuration.

Figure 1A:
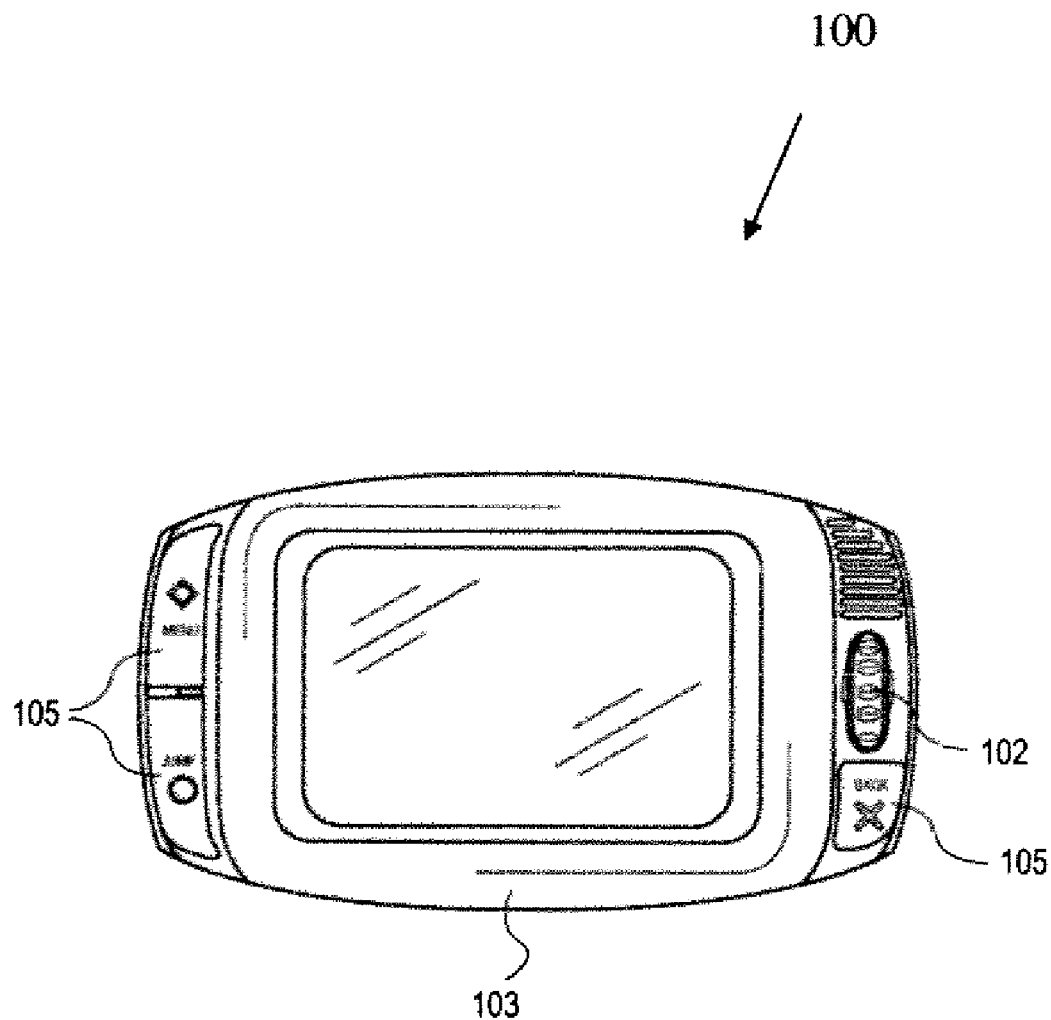
FIGS. 1a-c illustrate a prior art data processing device with an adjustable display.
Figures 1B, 1C:
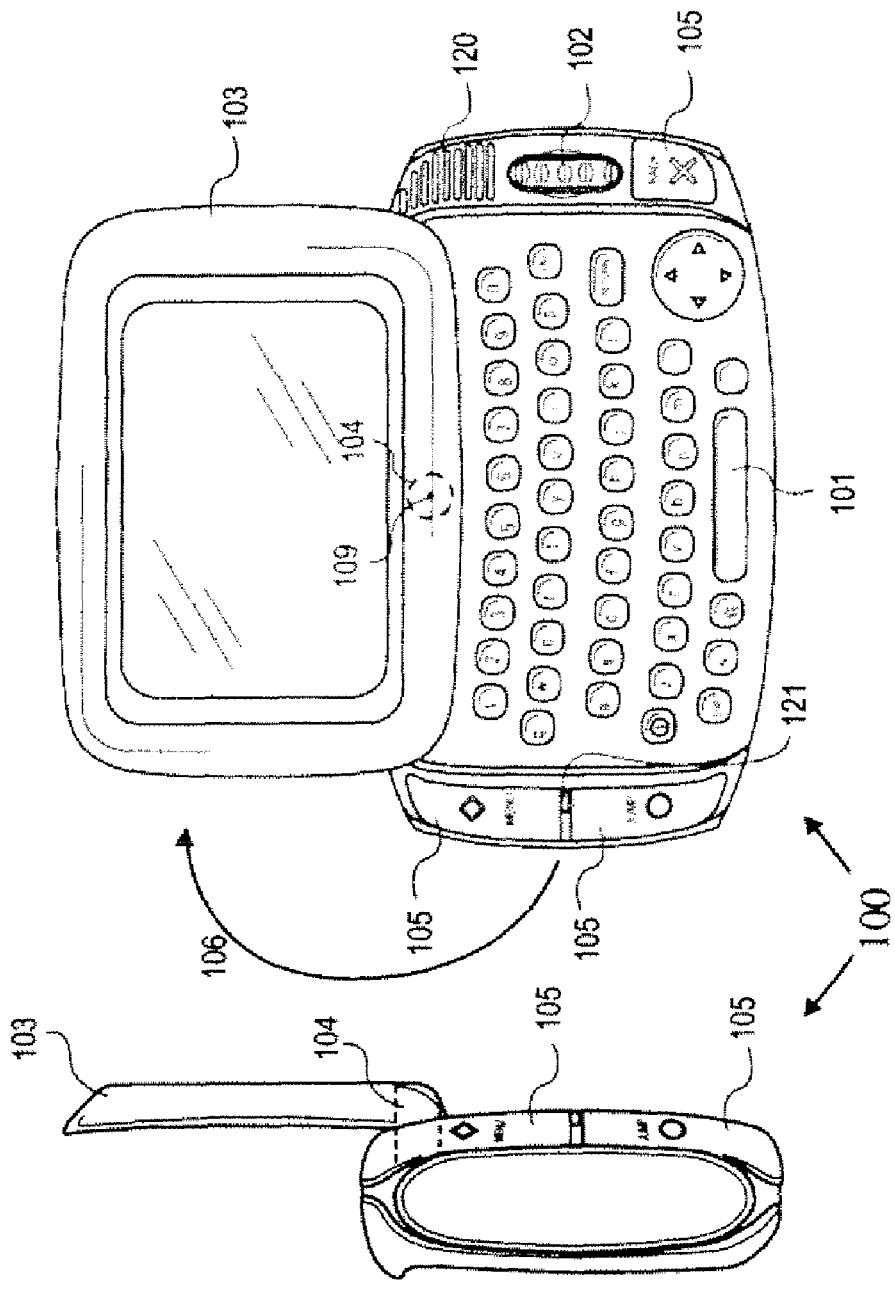
Figure 2:
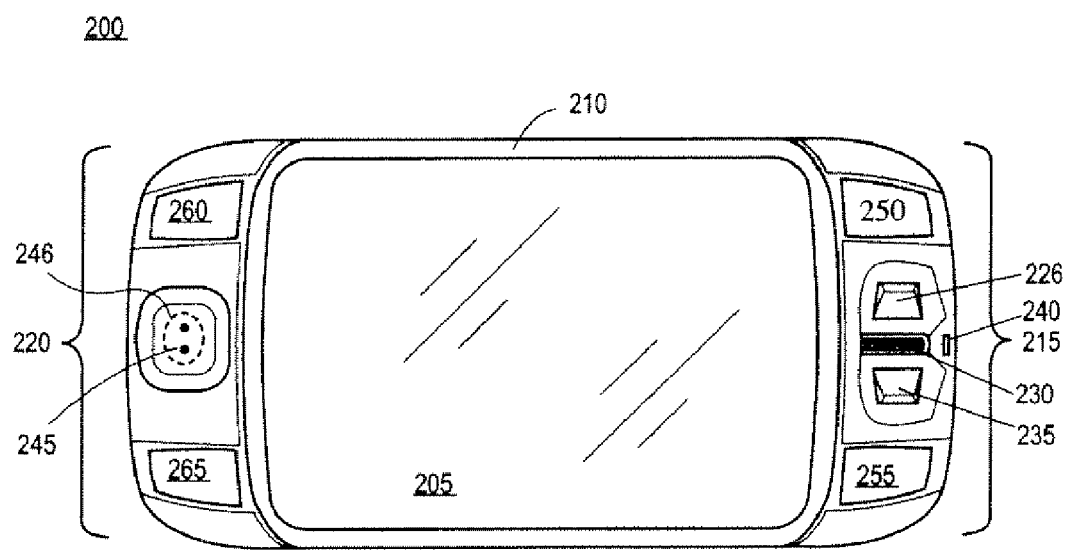
FIG. 2 illustrates another a prior art data processing device with an adjustable display.
Figure 3A:
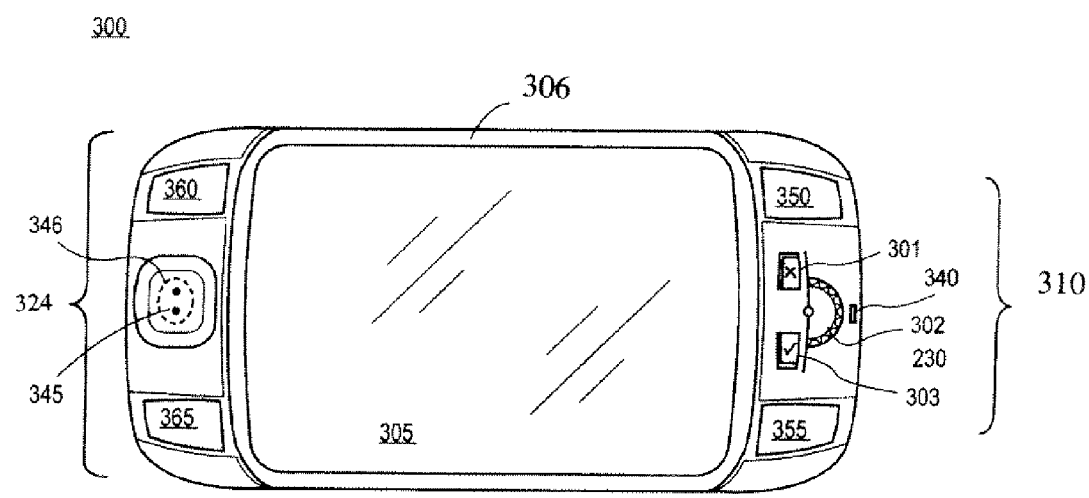
FIGS. 3a-b illustrate a data processing device with a scroll disc according to one embodiment of the scroll disc input apparatus for a data processing device.
Figure 3B:
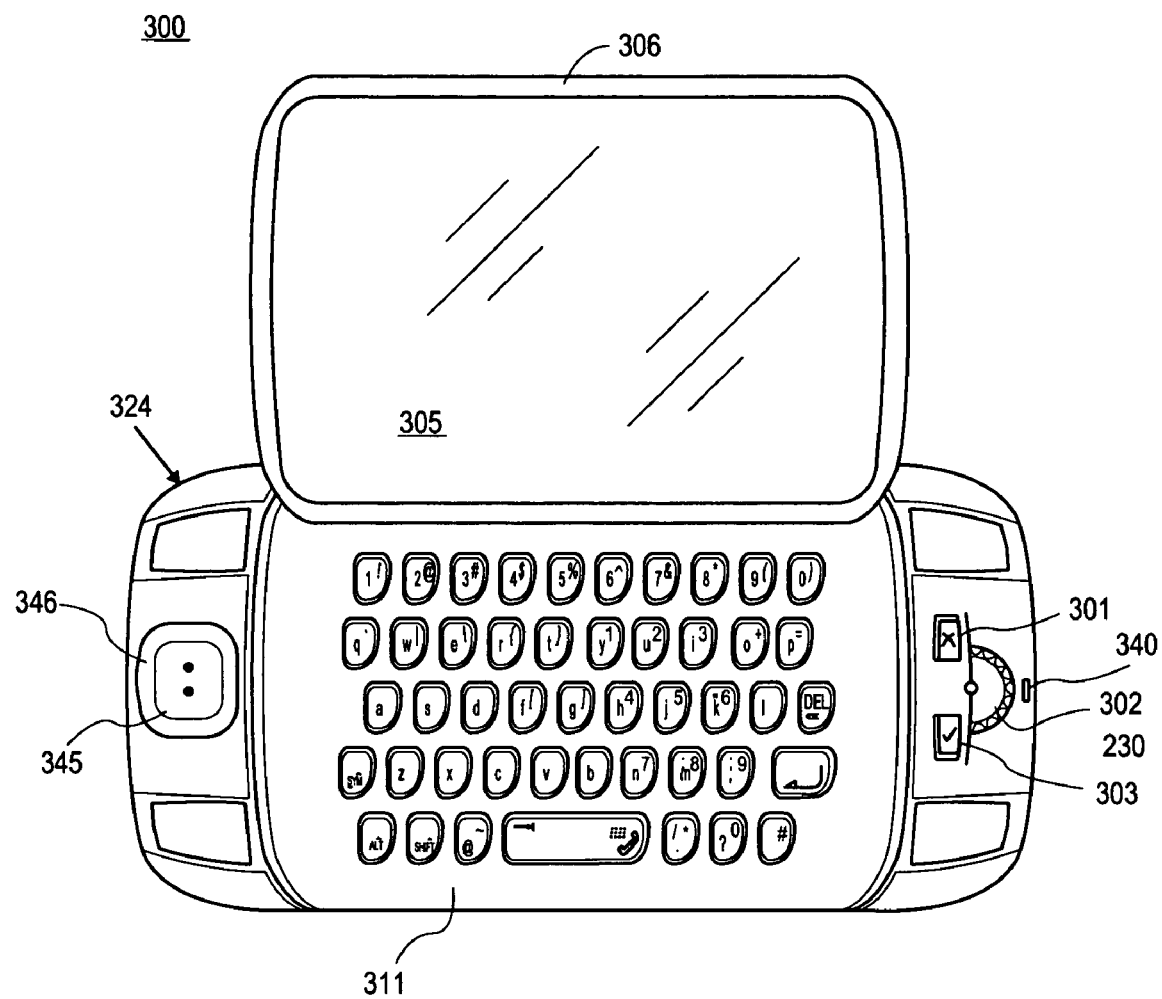

A data processing device 300 according to one embodiment of the invention is illustrated in FIGS. 3a-b. The data processing device 300 includes a display 306 with a viewable display area 305 for displaying various types of text and graphics (e.g., graphical navigation menus, email messages, electronic calendars, electronic address books, ... etc). In one embodiment, the display is a backlit or reflective thin film transistor ("TFT") display. In another embodiment, the display is a transflective SuperTwisted Nematican ("STN") display. However, the underlying principles of the invention are not limited to a particular display type. As in prior embodiments, the display rotates from a first position illustrated in FIG. 3a to a second position illustrated in FIG. 3b, thereby exposing an alphanumeric keyboard 311.

In one embodiment, the data processing device 300 includes a first set of control elements 310 positioned to the right of the display 306 and a second set of control elements 324 positioned to the left of the display (i.e., to the "left" and "right," respectively, in the first orientation illustrated in FIG. 3). Thus, the first set of control elements 310 are readily accessible by a user's right hand and the second set of control elements 324 are readily accessible by a user's left hand. As used herein, the term "control elements" means any type of data input or control mechanism associated with the data processing device 300 including, by way of example and not limitation, data entry keys such as alphanumeric keys, knobs, scroll discs, or buttons. As will be described in greater detail below, in one embodiment, the various control elements configured on the data processing device 300 may perform different operations in different operational modes.

In one embodiment, the first set of control elements 310 includes a scroll disc 302 positioned adjacent to two control buttons 301 and 303, as illustrated. When rotated, a cursor control signal is generated to move a cursor device, highlight bar or other selection graphic on the display 305 to select menu items, program icons and other graphical or textual display elements. When rotated upward, the scroll disc 302 generates a first cursor control signal directing the selection graphic in a first direction and when rotated downward, the scroll disc 302 generates a second cursor control signal directing the selection graphic in a second direction. In one embodiment, pressing the scroll wheel down, into the devices actuates a switch within the data processing device, thereby generating a selection signal to select graphical items on displayed on the display (e.g., menu items, email messages, . . . etc).

Unlike prior scroll wheels, the force required to generate the selection signal is substantially parallel to the axis of rotation. Moreover, the scroll disc 302 provides a significantly greater amount of surface area in the direction of movement when compared with the control wheels described in prior embodiments. Thus, the user may move the selection graphic a significantly greater distance on the display with a single thumb motion.

The two control buttons 301 and 303 may be configured to perform a variety of operations. For example, in one embodiment, the first button 301 is configured to select graphical/textual items highlighted on the display screen 305, and the second button 303 is configured to de-select items and/or to "back" out of a current application, menu, icon, . . . etc. Alternatively, or in addition (i.e., depending on the selected mode of operation), the second button 303 may cancel actions and return to the previous screen, and the first button 301 may save actions and return to the previous screen. By way of example, if the email application is open, selecting the second button 303 may cancel the composition of a new message, whereas the first button 301 may send or save a message that has been composed.

Alternatively, in one embodiment, the first control button 301 causes a selection graphic to move in a first direction and the second control button 303 causes the selection graphic to move in a second direction (e.g., the opposite direction). In one embodiment, the first control button 301 causes the selection graphic to move in the same direction as it moves when the scroll disc is rotated in a counter-clockwise direction and the second control button causes the selection graphic to move in the same direction as it moves when the scroll disc is rotated in a clockwise direction. In one embodiment, the first and second control buttons are configured to perform "page up" and "page down" functions, respectively. That is, selecting the first control button 301 causes the selection graphic to move up one page (e.g., one full display screen or one full document page) and the second control button 303 causes the selection graphic to move down one page.

In one embodiment, the second set of control elements includes a directional pad 345 having an integrated speaker 346 and/or LED (not shown) (or other light source). In one embodiment, the directional pad 345 may be used to move a cursor or other selection graphic in any direction on the display to enable selection of menu items, program icons and other graphical or textual display elements. The directional pad 345 may be made of frosted translucent plastic and may be white in color, although other materials and colors may be used. The LED contained in the directional pad may be a tri-color LED that generates a variety of colors to alert the user when an incoming message has been received. In "telephony mode," the speaker 346 contained in the directional pad 345 enables the user to hear the party on the other end of a call. In addition, a microphone 340 is configured at the end of the data processing device 300 opposite the speaker 346 so that the data processing device 300 may be held like a mobile phone while in telephony mode (i.e., when the speaker placed next to the user's ear, the microphone is located in the proximity of the user's mouth).

Figure 4:
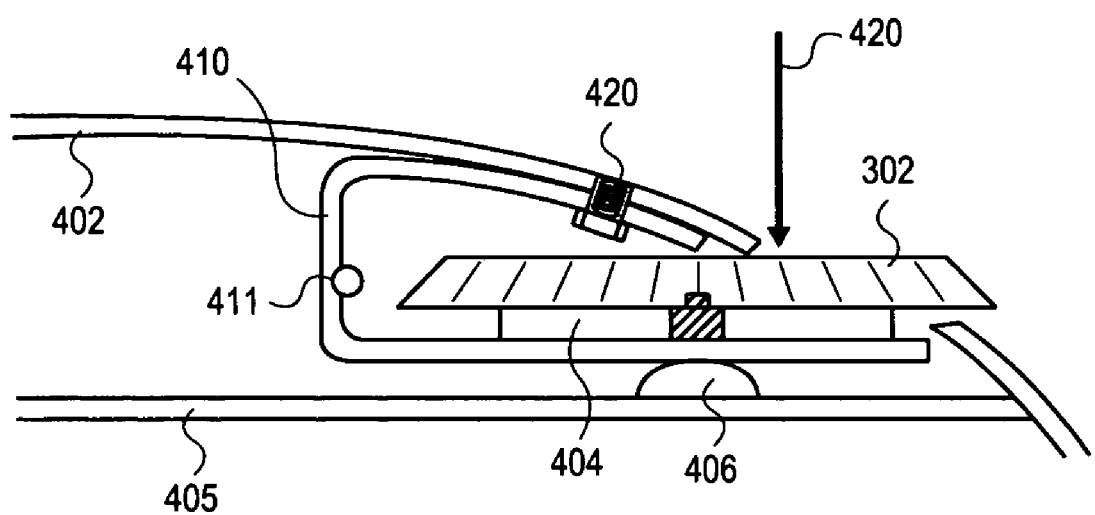
FIG. 4 illustrates a scroll disc apparatus according to one embodiment of the scroll disc input apparatus for a data processing device.

FIG. 4 illustrates how the scroll disc 302 is integrated within the data processing apparatus according to one embodiment of the invention. In this embodiment, the scroll disc 302 is coupled to a rotary encoder 404 which generates control signals in response to the rotation of the scroll disc. The combination of the scroll disc 302 and rotary encoder 404 is fixedly attached to a bracket 410 which is pivotally coupled to the data processing device at a pivot point 411. The bracket may be formed from plastic, sheet metal or any other rigid material. A spring 420 is coupled to the inner surface of the data processing device at one end and to the bracket at the other end, thereby generating a force on the bracket directed towards the inner surface 402. In one embodiment, when a user is not depressing the scroll wheel 302, the force applied by the spring bracket to contact the inner surface.

A dome switch, actuator bump or tact switch 406 is configured within the printed circuit board 405 of the data processing device. When a user applies a downward force to the scroll disc, as indicated by arrow 420, the bracket 410 pivots around the pivot point 411, thereby causing the lower portion of the bracket to apply a force to the dome switch 406. In response, the dome switch generates a selection signal which is then processed by the data processing device (e.g., causing a highlighted menu item to be selected, causing an email message to be opened, . . . etc). When the user removes the downward force from the scroll disc (i.e., removes his/her finger) the force applied by the spring 420 pulls the scroll wheel in an upward direction back to its "unselected" position.

In an alternate embodiment, rather than being attached via a spring, the bracket is fixedly attached to the inner housing 402 of the data processing device. In this embodiment, the bracket is formed from a rigid, flexible material which bends in response to the downward force applied by the user, thereby triggering the dome switch 406, and retracts to its original position when the downward force is removed.

Figure 5:
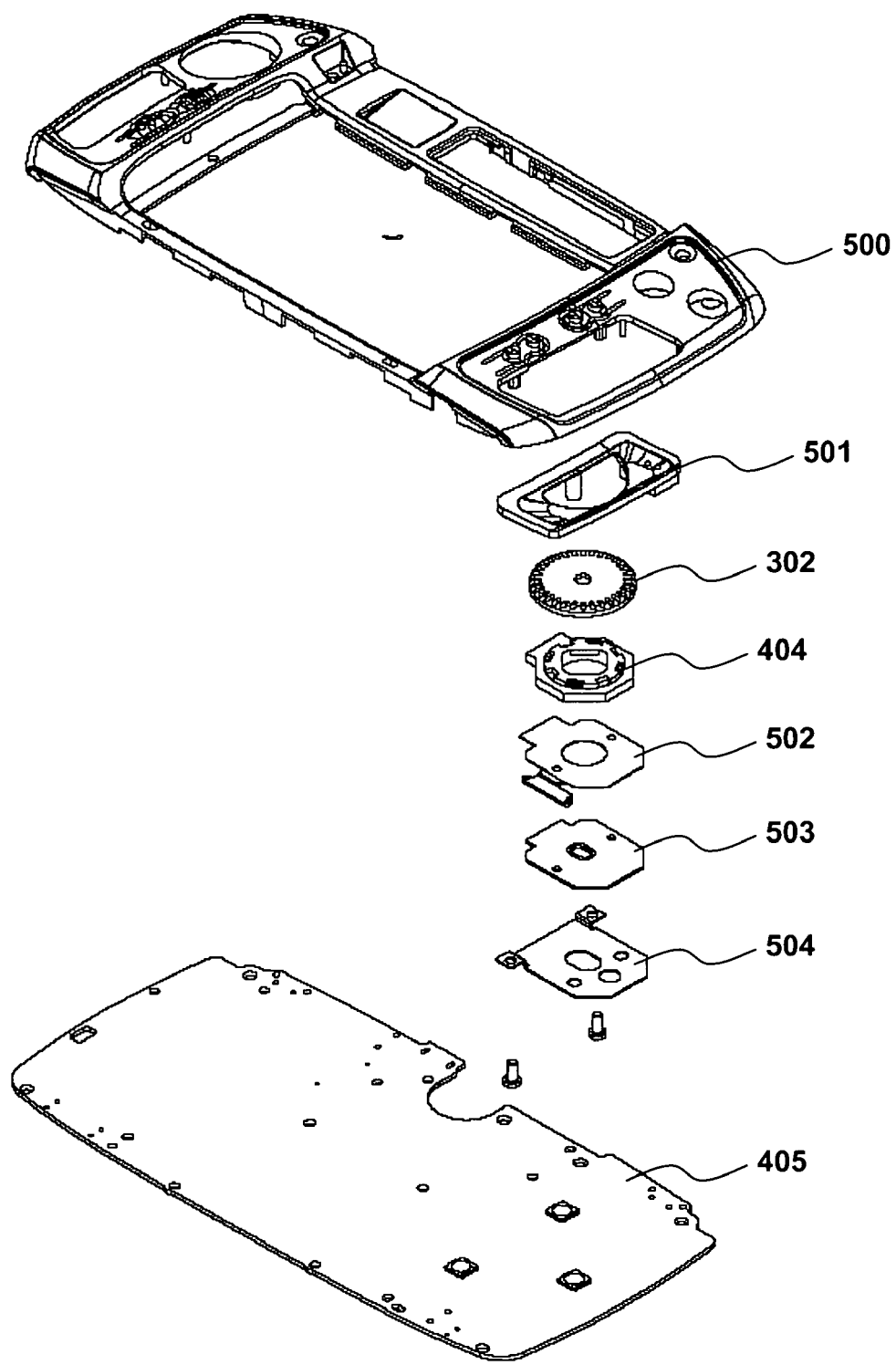
FIG. 5 illustrates how the scroll disc is integrated within a data processing device according to one embodiment of the scroll disc input apparatus for a data processing device.

FIG. 5 illustrates how the scroll disc 302 is integrated within a data processing device housing 500 according to one embodiment of the invention. A scroll disc well 501 is coupled to the data processing device housing 500. The scroll disc 302 is coupled to a rotary encoder 404 which translates the rotation of the scroll disc 302 into control signals through a flexible printed circuit board 502. A switch actuator 503, which provides the physical coupling to the dome switch 406, is sandwiched between the flexible printed circuit 502 and the scroll disc bracket. The scroll disc bracket 410 is coupled to the data processing device housing 500 using any of the techniques described above (e.g., via a spring or direct coupling).

Throughout the foregoing description, for the purposes of explanation, numerous specific details were set forth in order to provide a thorough understanding of the invention. It will be apparent, however, to one skilled in the art that the invention may be practiced without some of these specific details. For example, while the embodiments described above employ specific techniques for integrating the scroll disc within a data processing apparatus, the underlying principles of the invention are not limited to any particular integration technique. Accordingly, the scope and spirit of the invention should be judged in terms of the claims which follow.

What is claimed is:

1. An apparatus comprising:
   an outer housing;
   a display disposed in the outer housing;
   a bracket flexibly coupled to an inner surface of the outer housing and the bracket configured to pivot about a pivot point, located on the bracket, while the outer housing remains stationary with respect to the display;
   a scroll disc rotatably mounted within the bracket, the scroll disc rotating on an axis that is substantially perpendicular to a plane defined by the display, the scroll disc operable to cause a graphic element being displayed by the display to move in a first direction by a first predefined amount when rotated clockwise and to cause the graphic element to move in a second direction by the first predefined amount when rotated counterclockwise;
   a dome switch operable to provide an input to the apparatus, the dome switch mounted on a circuit board that is located on a plane parallel to the display, the dome switch configured to be actuated by the bracket pivoting around the pivot point responsive to a force applied to the scroll disc and substantially parallel to the axis; and
   a spring flexibly coupling the bracket to the inner surface of the outer housing, the spring configured to pull the bracket away from the dome switch responsive to the force applied to the scroll disc being removed.

2. The apparatus as in claim 1 further comprising:
   a first input button positioned in the outer housing adjacent to the scroll disc; and
   a second input button positioned in the outer housing adjacent to the scroll disc, the first input button being operable to cause the graphic element to move in the first direction by a second predefined amount when selected and the second input button being operable to cause the graphic element to move in the second direction by the second predefined amount when selected.

3. The apparatus as in claim 2 wherein the predefined amount comprises a page of information.

4. The apparatus as in claim 2 wherein a first portion of the scroll disc is housed within the outer housing and a second portion of the scroll disc is exposed.

5. The apparatus as in claim 4 wherein the first and second input buttons are positioned in the outer housing adjacent to the first portion of the scroll disc.

6. The apparatus as in claim 1, wherein the force is applied in parallel to a plane of the bracket on which the pivot point is located.

7. An apparatus comprising:
   an outer housing;
   a display disposed in the outer housing;

a bracket flexibly coupled to an inner surface of the outer housing and the bracket configured to pivot about a pivot point, located on the bracket, while the outer housing remains stationary with respect to the display;

a scroll disc rotatably mounted within the bracket, the scroll disc operable to cause a graphic element displayed by the display to move in a first direction by a first predefined amount when rotated clockwise and to cause the graphic element to move in a second direction by the first predefined amount when rotated counterclockwise;

a printed circuit board disposed within the outer housing on a plane that is parallel to the display;

a dome switch adjacent mounted to the printed circuit board and operable to provide an input to the apparatus, the dome switch configured to be actuated by the bracket pivoting around the pivot point responsive to a force applied to the scroll disc and substantially parallel to an axis of rotation of the scroll disc; and a spring flexibly coupling the bracket to the inner surface of the outer housing, the spring configured to pull the bracket away from the dome switch responsive to the force applied to the scroll disc being removed.

8. The apparatus as in claim 7 further comprising:
a first input button positioned in the outer housing adjacent to the scroll disc; and
a second input button positioned in the outer housing adjacent to the scroll disc, the first input button being operable to cause the graphic element to move in the first direction by a second predefined amount when selected and the second input button being operable to cause the graphic element to move in the second direction by a second predefined amount when selected.

9. The apparatus as in claim 8 wherein the predefined amount comprises a page of information.

10. The apparatus as in claim 7, wherein the force is applied in parallel to a plane of the bracket on which the pivot point is located.

11. An apparatus comprising:
a housing having a housing face including an opening;
a bracket flexibly coupled to an inner surface of the housing face and the bracket configured to pivot about a pivot point, located on the bracket, while the housing face remains stationary;
a scroll disc mounted within the bracket, the scroll disc including a generally flattened surface that is partially covered by the housing face and partially accessible through the opening to allow rotation of the scroll disc to provide a first input and depression of the scroll disc to provide a second input;
a dome switch operable to provide the second input to the apparatus, the switch configured to be actuated by the bracket pivoting within the housing substantially away from the housing face when the scroll disc is depressed; and
a spring flexibly coupling the bracket to the inner surface of the housing face, the spring configured to pull the bracket away from the dome switch responsive to the scroll disc being un-depressed.

\* \* \* \* \*